UNITED STATES PATENT OFFICE.

JAMES H. BRIDGE, OF NEW YORK, N. Y., AND CARLETON ELLIS, OF BOSTON, MASSACHUSETTS, ASSIGNORS, BY MESNE ASSIGNMENTS, OF ONE-THIRD TO SAWYER, FOSTER AND HARDY, OF BOSTON, MASSACHUSETTS, A FIRM.

PROCESS OF MAKING HYDRATED OXID OF LEAD.

No. 811,552.     Specification of Letters Patent.     Patented Feb. 6, 1906.

Application filed March 14, 1904. Serial No. 198,013.

*To all whom it may concern:*

Be it known that we, JAMES H. BRIDGE, of New York, in the county of New York and State of New York, and CARLETON ELLIS, of Boston, in the county of Suffolk and Commonwealth of Massachusetts, have invented certain new and useful Improvements in Processes for Making Hydrated Oxid of Lead, of which the following is a specification.

The usual method of converting metallic lead into the hydrated oxid of lead consists in the dissolution of the metal in an acid which forms a soluble lead salt and in subsequently adding to the lead-salt solution an alkaline hydroxid to precipitate the lead as hydrated oxid. This procedure gives rise to a by-product of low value—namely, the salt formed by the alkaline base with the acid employed. For instance, the solution of lead in nitric acid and precipitation by caustic soda yields a by-product of nitrate of soda whose market value is much less than that of the acid and alkali consumed in the process.

It is the object of our invention to produce the hydrated lead by a method which eliminates the formation of waste products, but which by its cyclic action re-forms the active materials as rapidly as they are consumed. For this purpose we employ the electric current. It is well known that if saline matter is electrolyzed in aqueous solution, using a metallic anode, that with a suitable current the metal is dissolved to form a salt of the acid set free by the electrolysis of the saline electrolyte. With an anode of lead dissolving under such conditions we have found that an electrolyte containing the salt of an alkali or alkaline earth by the formation of free alkali at the cathode during electrolysis and by the subsequent diffusion and mingling of the anolyte and catholyte brings about the formation and precipitation of hydrated oxid of lead in an amorphous condition. The various attempts to produce hydrate of lead by electrolytical means have proven unsuccessful heretofore, because the electrolyte chosen either has been too costly—*e. g.*, sodium acetate—or has been liable to decomposition, thereby giving rise to complicated reactions and impairing the efficiency of the process—*e. g.*, sodium nitrate. The electrolyte which we employ is sodium chlorid, which is neither costly nor liable to undergo secondary reactions. Depending on these principles, our process resolves itself into the following elements: the introduction into a saline solution of a mass of lead to serve as anode and of a conducting body of indifferent material to act as cathode. Upon passage of an electric current through the solution lead dissolves and its precipitation as hydroxid is accomplished *in situ*. For best results the following conditions obtain: The anode should be of a good quality of lead quite free from iron. Ordinary pig-lead is usually suitable. It need not be cast to any special shape for the purpose. Lead in the pig form will serve. The cathode may be of any good conducting material unaffected by alkaline liquors. Lead, platinum, or graphite are serviceable. The electrolyte should contain sodium chlorid or purified brine and should be heated to prevent the precipitation of lead chlorid during the electrolysis.

The following is an example of our method for the production of hydroxid of lead: A current of twenty amperes per square foot of anode surface with an electromotive force of six volts was passed through an electrolyte of hot brine of 10° Baumé gravity. A bar of lead constituted the anode; a carbon rod, the cathode. Soon after starting electrolysis a white precipitate began to form between the electrodes and gradually increased in amount. It slowly settled to the bottom of the cell, where it was collected. At the close of the operation the lead anode had lost twenty-seven grams in weight, while the precipitate of hydroxid of lead weighed thirty grams. The reactions which took place may be expressed as follows:

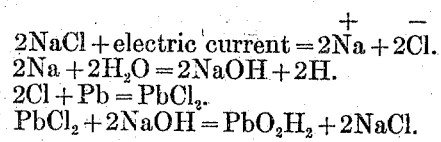

$$2NaCl + \text{electric current} = 2\overset{+}{Na} + 2\overset{-}{Cl}.$$
$$2Na + 2H_2O = 2NaOH + 2H.$$
$$2Cl + Pb = PbCl_2.$$
$$PbCl_2 + 2NaOH = PbO_2H_2 + 2NaCl.$$

From these reactions it will be seen that the process is cyclic as regards the electrolyte. The net result of the process is the formation of hydroxid of lead.

It is necessary to employ a hot solution of the electrolyte in order to obtain a pure hydrate of lead. Lead chlorid or oxychlorid would otherwise contaminate the product. Chlorid of lead is easily soluble in hot water, while it is almost insoluble in cold water. The metathesis between lead chlorid and sodium hydrate can take place completely only by contact of these compounds in a dissolved condition. It is evident that this condition can be secured only by elevating the temperature of the electrolyte.

What we claim as our invention, and desire to secure by Letters Patent, is—

1. Process for making hydrated oxid of lead which consists in the electrolysis, with lead anodes, of hot aqueous solutions of purified brine; in mingling the products of said electrolysis; and in separating the so-formed hydrated oxid of lead.

2. Process for making hydrated oxid of lead which consists in the electrolysis, with lead anodes, of hot concentrated solutions of sodium chlorid; in mingling the anolyte and catholyte; in removing from the electrolyte the insoluble lead compounds thereby formed; and in returning the said electrolyte to the electrolytic cell.

3. Process for making hydrated oxid of lead which consists in the electrolysis, with lead anodes, of hot aqueous solutions of sodium chlorid; in mingling the anolyte and catholyte; in separating from the electrolyte the so-formed hydroxid of lead; and in bringing the said electrolyte again into the region of electrolytic action.

4. Process for the continuous production of hydrated oxid of lead which consists in the electrolysis, with lead anodes, of a hot aqueous solution of sodium chlorid; in commingling the anolyte and catholyte to produce hydrated oxid of lead and to re-form the original electrolyte; in removing therefrom the insoluble lead compounds; and in again subjecting the said electrolyte to aforesaid electrolysis.

In testimony whereof we have affixed our signatures in presence of two witnesses.

JAMES H. BRIDGE.
CARLETON ELLIS.

Witnesses:
SOPHIA WILSON,
MARGERY BRIDGE.